(12) United States Patent
DeJonghe et al.

(10) Patent No.: US 8,343,686 B2
(45) Date of Patent: Jan. 1, 2013

(54) JOINED CONCENTRIC TUBES

(75) Inventors: Lutgard DeJonghe, Lafayette, CA (US); Craig Jacobson, Moraga, CA (US); Michael Tucker, Oakland, CA (US); Steven Visco, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 609 days.

(21) Appl. No.: 12/304,191

(22) PCT Filed: Jul. 28, 2006

(86) PCT No.: PCT/US2006/029580
§ 371 (c)(1),
(2), (4) Date: May 21, 2009

(87) PCT Pub. No.: WO2008/016345
PCT Pub. Date: Feb. 7, 2008

(65) Prior Publication Data
US 2010/0038012 A1    Feb. 18, 2010

(51) Int. Cl.
*H01M 8/10* (2006.01)
*H01M 4/88* (2006.01)
*H01M 2/08* (2006.01)
*H01M 2/14* (2006.01)
*H01M 8/00* (2006.01)

(52) U.S. Cl. ........ 429/497; 429/486; 429/488; 429/495; 429/507; 429/510; 429/535

(58) Field of Classification Search .................. 429/466, 429/497, 486, 488, 495, 507, 510, 535; 427/115
See application file for complete search history.

(56) References Cited

U.S. PATENT DOCUMENTS

| | | | |
|---|---|---|---|
| 3,324,543 A | 6/1967 | McVey et al. | |
| 3,402,230 A | 9/1968 | White | |
| 3,525,646 A | 8/1970 | Tannenberger et al. | |
| 3,668,010 A | 6/1972 | Fally et al. | |
| 3,773,549 A | 11/1973 | Elbert | |
| 4,560,607 A | 12/1985 | Sumner | |
| 4,562,124 A | 12/1985 | Ruka | |
| 4,624,897 A | 11/1986 | Ito | |
| 4,687,717 A | 8/1987 | Kaun et al. | |

(Continued)

FOREIGN PATENT DOCUMENTS

CN    1498877 A    5/2004

(Continued)

OTHER PUBLICATIONS

CN200580040834.4, Notification to grant patent right for invention, mailed Apr. 17, 2009.

(Continued)

*Primary Examiner* — Patrick Ryan
*Assistant Examiner* — Julian Anthony
(74) *Attorney, Agent, or Firm* — Weaver Austin Villeneuve & Sampson LLP

(57) ABSTRACT

Tubular objects having two or more concentric layers that have different properties are joined to one another during their manufacture primarily by compressive and friction forces generated by shrinkage during sintering and possibly mechanical interlocking. It is not necessary for the concentric tubes to display adhesive-, chemical- or sinter-bonding to each other in order to achieve a strong bond. This facilitates joining of dissimilar materials, such as ceramics and metals.

20 Claims, 5 Drawing Sheets

U.S. PATENT DOCUMENTS

| | | | |
|---|---|---|---|
| 4,720,335 A | 1/1988 | Fukushima et al. |
| 4,763,828 A | 8/1988 | Fukaya et al. |
| 4,847,172 A | 7/1989 | Maskalick et al. |
| 4,917,958 A | 4/1990 | Akai et al. |
| 4,929,294 A | 5/1990 | Blome |
| 4,942,999 A | 7/1990 | Oda et al. |
| 5,013,612 A | 5/1991 | Hunt et al. |
| 5,043,229 A | 8/1991 | Mizuhara |
| 5,127,969 A | 7/1992 | Sekhar |
| 5,173,372 A | 12/1992 | Matsuo et al. |
| 5,236,787 A | 8/1993 | Grassi |
| 5,240,480 A | 8/1993 | Thorogood et al. |
| 5,279,909 A | 1/1994 | Horner et al. |
| 5,306,411 A | 4/1994 | Mazanec et al. |
| 5,318,951 A | 6/1994 | Shintaku et al. |
| 5,328,779 A | 7/1994 | Tannenberger et al. |
| 5,366,770 A | 11/1994 | Wang |
| 5,441,825 A | 8/1995 | Barlow |
| 5,480,739 A | 1/1996 | Kawaskai et al. |
| 5,487,803 A | 1/1996 | Sweeney et al. |
| 5,589,285 A | 12/1996 | Cable et al. |
| 5,626,914 A | 5/1997 | Ritland et al. |
| 5,629,103 A | 5/1997 | Wersing et al. |
| 5,633,081 A | 5/1997 | Cough et al. |
| 5,670,270 A | 9/1997 | Wallin |
| 5,672,848 A | 9/1997 | Komorita et al. |
| 5,686,198 A | 11/1997 | Kuo et al. |
| 5,735,332 A | 4/1998 | Ritland et al. |
| 5,741,605 A | 4/1998 | Gillett et al. |
| 5,750,279 A | 5/1998 | Carolan et al. |
| 5,827,620 A | 10/1998 | Kendall |
| 5,908,713 A | 6/1999 | Ruka et al. |
| 5,932,368 A | 8/1999 | Batawi et al. |
| 5,938,822 A | 8/1999 | Chen et al. |
| 5,976,216 A | 11/1999 | Samal et al. |
| 5,993,986 A | 11/1999 | Wallin et al. |
| 6,007,683 A | 12/1999 | Jankowski et al. |
| 6,017,647 A | 1/2000 | Wallin |
| 6,188,582 B1 | 2/2001 | Peter |
| 6,217,732 B1 | 4/2001 | Schuh et al. |
| 6,270,642 B1 | 8/2001 | Basu et al. |
| 6,293,978 B2 | 9/2001 | Kleefisch et al. |
| 6,296,910 B1 | 10/2001 | Choy et al. |
| 6,344,291 B1 | 2/2002 | Hitomi |
| 6,348,273 B1 | 2/2002 | Ishikawa et al. |
| 6,358,567 B2 | 3/2002 | Pham et al. |
| 6,368,383 B1 | 4/2002 | Virkar et al. |
| 6,372,078 B1 | 4/2002 | Melchert et al. |
| 6,390,354 B1 | 5/2002 | Makino et al. |
| 6,420,064 B1 | 7/2002 | Ghosh et al. |
| 6,428,920 B1 | 8/2002 | Badding et al. |
| 6,436,565 B1 * | 8/2002 | Song et al. ............ 429/535 |
| 6,440,578 B1 | 8/2002 | Shinkai et al. |
| 6,492,050 B1 | 12/2002 | Sammes |
| 6,541,146 B1 | 4/2003 | Xue et al. |
| 6,565,621 B2 | 5/2003 | Shinkai et al. |
| 6,576,363 B1 | 6/2003 | Hitomi |
| 6,589,680 B1 | 7/2003 | Gorte et al. |
| 6,605,316 B1 | 8/2003 | Visco et al. |
| 6,653,009 B2 | 11/2003 | Wang et al. |
| 6,656,625 B1 | 12/2003 | Thompson et al. |
| 6,682,842 B1 | 1/2004 | Visco et al. |
| 6,742,700 B2 | 6/2004 | Makino et al. |
| 6,767,622 B2 | 7/2004 | Hada et al. |
| 6,767,662 B2 | 7/2004 | Jacobson et al. |
| 6,783,880 B2 | 8/2004 | Christiansen |
| 6,800,323 B2 | 10/2004 | Pan |
| 6,846,511 B2 | 1/2005 | Visco et al. |
| 6,887,361 B1 | 5/2005 | Visco et al. |
| 6,896,992 B2 | 5/2005 | Kearl |
| 6,974,516 B2 | 12/2005 | Devoe et al. |
| 6,979,511 B2 | 12/2005 | Visco et al. |
| 6,994,884 B1 | 2/2006 | Guan et al. |
| 7,055,733 B2 | 6/2006 | Weil et al. |
| 7,118,777 B2 | 10/2006 | Visco et al. |
| 7,153,559 B2 | 12/2006 | Ito et al. |
| 7,163,713 B2 | 1/2007 | Jacobson et al. |
| 7,208,246 B2 | 4/2007 | Herman et al. |
| 7,218,502 B2 | 5/2007 | Fujii et al. |
| 7,232,626 B2 | 6/2007 | Jacobson et al. |
| 7,273,673 B2 | 9/2007 | Akikusa et al. |
| 7,351,488 B2 | 4/2008 | Visco et al. |
| 7,553,573 B2 | 6/2009 | Visco et al. |
| 2001/0012576 A1 | 8/2001 | Christiansen et al. |
| 2002/0028367 A1 | 3/2002 | Sammes et al. |
| 2002/0048699 A1 | 4/2002 | Steele et al. |
| 2002/0081762 A1 | 6/2002 | Jacobson et al. |
| 2002/0177031 A1 | 11/2002 | Doshi et al. |
| 2003/0021900 A1 | 1/2003 | Jacobson et al. |
| 2003/0024611 A1 | 2/2003 | Cornie et al. |
| 2003/0059668 A1 | 3/2003 | Visco et al. |
| 2003/0132270 A1 | 7/2003 | Weil et al. |
| 2003/0188637 A1 | 10/2003 | Ito et al. |
| 2003/0224234 A1 | 12/2003 | Steele et al. |
| 2004/0023101 A1 | 2/2004 | Jacobson et al. |
| 2004/0028994 A1 | 2/2004 | Akikusa et al. |
| 2004/0112478 A1 | 6/2004 | Bieler et al. |
| 2004/0135324 A1 | 7/2004 | Brule et al. |
| 2004/0219423 A1 | 11/2004 | Tunney et al. |
| 2004/0231143 A1 | 11/2004 | Visco et al. |
| 2004/0240142 A1 | 12/2004 | Fujii et al. |
| 2005/0000621 A1 | 1/2005 | Devoe et al. |
| 2005/0022921 A1 | 2/2005 | Morrison et al. |
| 2005/0037252 A1 | 2/2005 | Pham |
| 2005/0048343 A1 | 3/2005 | Thirukkvalur |
| 2005/0095479 A1 | 5/2005 | Mardilovich et al. |
| 2005/0147857 A1 | 7/2005 | Crumm et al. |
| 2005/0170234 A1 | 8/2005 | Liu et al. |
| 2005/0214612 A1 | 9/2005 | Visco et al. |
| 2005/0214616 A1 | 9/2005 | Kumar et al. |
| 2005/0221153 A1 | 10/2005 | Sugimoto et al. |
| 2005/0271931 A1 | 12/2005 | Finnerty |
| 2006/0029860 A1 | 2/2006 | Ketcham et al. |
| 2006/0051643 A1 | 3/2006 | Sarkar et al. |
| 2006/0057295 A1 | 3/2006 | Visco et al. |
| 2006/0153974 A1 | 7/2006 | Matsuzaki et al. |
| 2006/0228615 A1 | 10/2006 | Armstrong et al. |
| 2006/0234112 A1 | 10/2006 | Visco et al. |
| 2007/0059576 A1 | 3/2007 | Jacobson et al. |
| 2007/0117006 A1 | 5/2007 | Zhan et al. |
| 2007/0166603 A1 | 7/2007 | Nakanishi et al. |
| 2008/0118804 A1 | 5/2008 | Tucker et al. |
| 2008/0131723 A1 | 6/2008 | Tucker et al. |
| 2008/0254335 A1 | 10/2008 | Torgerson et al. |
| 2008/0268323 A1 | 10/2008 | Tucker et al. |
| 2010/0143824 A1 | 6/2010 | Tucker et al. |
| 2011/0053041 A1 | 3/2011 | Tucker et al. |
| 2011/0104586 A1 | 5/2011 | Tucker et al. |
| 2011/0269047 A1 | 11/2011 | Tucker et al. |

FOREIGN PATENT DOCUMENTS

| | | |
|---|---|---|
| CN | 101065860 | 10/2007 |
| CN | 200580040834 | 10/2007 |
| CN | 200580041105 | 11/2007 |
| EP | 0428275 | 5/1991 |
| EP | 0562724 | 9/1993 |
| EP | 1122806 | 8/2001 |
| EP | 1699104 | 9/2006 |
| FR | 1585403 | 1/1970 |
| GB | 1276615 | 6/1972 |
| GB | 1383343 | 12/1974 |
| GB | 2156257 | 10/1985 |
| JP | 59-046695 | 9/1980 |
| JP | 56-002549 | 1/1981 |
| JP | 59-015960 | 1/1984 |
| JP | 59-016695 | 1/1984 |
| JP | 60-090875 | 5/1985 |
| JP | 05-089883 | 4/1993 |
| JP | 05-163078 | 6/1993 |
| JP | 06-042990 | 2/1994 |
| JP | 40-700676801 | 1/1995 |
| JP | 07-069749 | 3/1995 |
| JP | 07-126079 | 5/1995 |
| JP | 07-237980 | 9/1995 |
| JP | 07-067747 | 10/1995 |
| JP | 09-092301 | 4/1997 |
| JP | 09-188582 | 7/1997 |

| | | |
|---|---|---|
| JP | 09-296203 | 11/1997 |
| JP | 10-021931 | 1/1998 |
| JP | 11-292618 | 10/1999 |
| JP | 11-297333 | 10/1999 |
| JP | 2001-126745 | 5/2001 |
| JP | 2002/289249 | 10/2002 |
| JP | 2002/301588 | 10/2002 |
| JP | 2003-288913 | 10/2003 |
| JP | 2004-039574 | 2/2004 |
| JP | 2004-047598 | 2/2004 |
| JP | 2004-127761 | 4/2004 |
| JP | 2004-142971 | 5/2004 |
| JP | 2004-164864 | 6/2004 |
| JP | 2004-207088 | 7/2004 |
| JP | 2004-273736 | 9/2004 |
| JP | 2005-288526 | 10/2005 |
| JP | 2005-353493 | 12/2005 |
| RU | 1822388 | 6/1993 |
| RU | 2236331 | 1/2003 |
| RU | 2197441 | 9/2004 |
| SU | 1407675 | 7/1988 |
| WO | 97/00734 | 9/1997 |
| WO | 99/52165 | 10/1999 |
| WO | 9952165 | 10/1999 |
| WO | 99/65642 | 12/1999 |
| WO | 99/66570 | 12/1999 |
| WO | 00-34539 | 6/2000 |
| WO | 00/52780 | 9/2000 |
| WO | 03/007312 | 1/2003 |
| WO | 2004/008556 | 1/2004 |
| WO | 2004/070858 | 8/2004 |
| WO | 2006/044313 | 4/2006 |
| WO | 2006/082057 | 8/2006 |
| WO | 2006/086037 | 8/2006 |
| WO | 2006/091250 | 8/2006 |
| WO | 2006086037 | 8/2006 |
| WO | 2006/116153 | 11/2006 |
| WO | 2006-127045 | 11/2006 |
| WO | 2008/016345 | 2/2008 |
| WO | 2009/014775 | 1/2009 |
| WO | 2009/099447 | 8/2009 |
| WO | 2009/128849 | 10/2009 |
| WO | 2010/030300 | 3/2010 |

OTHER PUBLICATIONS

CN200580041105.0, Notification to grant patent right for invention, mailed Aug. 28, 2009.
EP patent application No. 05857980.6, Supplemental Search Report mailed Dec. 15, 2009.
EP patent application No. 05857595.2, Search Report mailed Oct. 15, 2009.
EP patent application NO. 05857587.9, Supplemental Search Report mailed Oct. 26, 2009.
MY patent application No. PI20055578, Examination Report mailed Aug. 14, 2009.
RU patent application No. 2007124484-02, Office Action mailed Nov. 16, 2009.
TW patent application No. 094141561, Examination Report mailed Mar. 8, 2010.
VN patent application No. 1-2007-01278, Exam Report mailed Jul. 7, 2007.
VN patent application No. 1-2007-01267, Exam Report mailed Jul. 29, 2009.
Naka, Masaaki et al., "Joining of plain carbon steel to alumina with copper filler metal", Yosetsu Gakkai Ronbunshu—Quarterly Journal of the Japan Welding Society, Yosetsu Gakkai, Tokyo, Japan, vol. 3, No. 4, Nov. 1, 1985, pp. 702-707, XP009010006, ISSN: 0288-4771.
CN patent application No. 200580041105.0, Office Action mailed Oct. 24, 2008.
RU patent application No. 200712448309, Office Action mailed Jan. 26, 2009.
WO patent application No. PCT/US2005/042995, International Search Report and Written Opinion mailed Dec. 26, 2006.
WO patent application No. PCT/US05/43109, International Search Report and Written Opinion mailed Oct. 12, 2006.
WO patent application No. PCT/US05/42572, International Search Report and Written Opinion mailed Jun. 29, 2006.
Li, J.Q. et al., "Fabrication and thermal properties of a YSZ-NiCr joint with an interlayer of YSZ-NiCr functionally graded material", Journal of the European Ceramic Society 23 (2003) 1847-1853.
Zhou, Xia et al., "Fabrication of composite alloy cladding material by brazing process", Journal of Materials Processing Technology 168 (2005) 280-285.
Zhu, Minguang et al., "Improving the strength of brazed joints to alumina by adding carbon fibres", 0022-2461, Apr. 17, 1997, Chapman & Hall.
Blugan, Gurdial et al., "Brazing of silicon nitride ceramic composite to steel using SiC-particle-reinforced active brazing alloy", 0272-8842, Mar. 10, 2006, Elsevier Ltd. and Techna Group.
CN patent application No. 200580040834.4, Office Action mailed Aug. 1, 2008.
WO patent application No. PCT/US2008/060362, International Search Report and Written Opinion mailed Jan. 12, 2009.
WO patent application No. PCT/US2008/066737, International Search Report and Written Opinion mailed Jan. 29, 2009.
WO patent application No. PCT/US2008/053869, International Search Report and Written Opinion mailed Oct. 29, 2008.
WO patent application No. PCT/US2008/081531, International Search Report and Written Opinion mailed Mar. 31, 2009.
Lee, Sungkyu et al., "Fabrication and characterization of Cu/YSZ cermet high-temperature electrolysis cathode material prepared by high-entergy ball-milling method I. 900° C.-sintered", Journal of Alloys and Compounds 448 (2008) 363-367, Aug. 17, 2007.
Gorte, Raymond J. et al., "Anodes for direct oxidation of dry hydrocarbons in a solid-oxide fuel cell", Advanced Materials, 2000, 12, No. 19, pp. 1465-1469, Oct. 2, 2000.
Park, Seungdoo et al., "Direct oxidation of Hydrocarbons in a solid Oxide Fuel Cell I. Methane Oxidation" Journal of the Electrochemical Society, 146 (10) 3603-3605 (1999), Mar. 8, 1999.
U.S. Appl. No. 12/664,646, "Interlocking structure for high temperature electrochemical device and method for making the same", Tucker et al., filed Dec. 14, 2009.
U.S. Appl. No. 61/046,313, "Integrated seal for high-temperature electrochemical device", Tucker et al., filed Apr. 18, 2008.
U.S. Appl. No. 61/025,987, "CU-based cermet for high-temperature electrochemical device", Tucker et al., filed Feb. 4, 2008.
U.S. Appl. No. 61/026,079, "CU-based cermet for high-temperature electrochemical device", Tucker et al., filed Feb. 4, 2008.
U.S. Appl. No. 61/096,177, "Metal-supported, segmented-in-series high temperature electrochemical device", Tucker et al., filed Sep. 11, 2008.
WO patent application No. PCT/US2006/029580, International Search Report and Written Opinion mailed Jul. 3, 2008.
Stevenson, Jeff, "SOFC Seals: Material status", SECA Core Technology Program—SOFC Meeting, Jul. 8, 2003, 28 pages.
CA patent application No. 2,627,786, Office Action mailed Dec. 21, 2010.
AU patent application No. 2005332026, Exam Report mailed Sep. 29, 2010.
AU patent application No. 2005327925, Office Action mailed Jul. 5, 2010.
AU patent application No. 2005327164, Office Action mailed Aug. 6, 2010.
JP patent application No. 2007-543481, Notification of reasons for rejection mailed Oct. 5, 2010 (English translation).
Translated excerpt from JP2005-288526.
Translated excerpt from JP2004-047598.
CN patent application No. 200680055443.4, Office Action mailed Dec. 21, 2010.
RU patent application No. 200910693002, Office Action mailed Sep. 21, 2010.
WO patent application No. PCT/US05/042572, International Preliminary Report on Patentability mailed Jun. 14, 2006.
U.S. Appl. No. 11/791,269, Office Action mailed Dec. 27, 2010.
U.S. Appl. No. 11/791,258, Office Action mailed Feb. 16, 2011.
EP patent application No. 08 768 912.1-3122, Examination Report mailed Feb. 14, 2011.

WO patent application No. PCT/US06/29580, International Search Report and Written Opinion mailed Jul. 3, 2008.
JP patent application No. 2007-543579, Office Action mailed Jan. 25, 2011.
European Examination Report mailed Jun. 17, 2011 for Application No. 08770865.7.
U.S. Appl. No. 11/791,258, Office Action mailed Aug. 18, 2011.
U.S. Appl. No. 11/791,269, Office Action mailed Sep. 30, 2011.
EP patent application No. 05857587.9, Examination Report mailed Aug. 15, 2011.
MY patent application No. PI 20055579, Substantive Examination Adverse Report mailed Aug. 15, 2011.
CN patent application No. 200680055443.4, Second Office Action mailed Jul. 12, 2011.
PH patent application No. 12008502790, Office Action mailed Sep. 12, 2011.
EP patent application No. 08826523.6, Extended Search Report mailed Aug. 30, 2011.
U.S. Appl. No. 11/791,270, Office Action mailed Jul. 27, 2011.
U.S. Appl. No. 11/791,258, Office Action mailed Dec. 6, 2011.
JP patent application No. 2007-543579, Final Decision of Rejection mailed Oct. 4, 2011.
CA patent application No. 2,627,863, Office Action mailed Nov. 17, 2011.
JP patent application No. 2007-543481, Office Action mailed Nov. 29, 2011.
JP patent application No. 2009-521730, Office Action mailed Oct. 25, 2011.
MY patent application No. PI20055578, substantive examination mailed Dec. 30, 2011.
KR patent application No. 10-2007-7009946, Notification of Provisional Rejection mailed Jan. 20, 2012.
IN patent application No. 2386/KOLN/2007, First Examination Report mailed Jan. 31, 2012.
EP patent application No. 06836096.5, Supplementary European Search Report mailed Feb. 3, 2012.
Ishida et al., NGK Spark Plug Co. Ltd., abstract of JP 19830079832, Thomson Scientific, XP-002667365, Nov. 21, 1984.
Fujiki et al., Kobe Steel Ltd., abstract of JP 19960109959, Thomson Scientific, XP-002667366, Nov. 18, 1997.
AU patent application No. 2008279577, Examiner's first report mailed Jan. 27, 2012.
PH patent application No. 12010500175, Office Action mailed Feb. 2, 2012.
RU patent application No. 2010136676/20, Office Action of the Formal Examination mailed Jan. 17, 2011.
U.S. Appl. No. 11/791,270, Office Action mailed Mar. 15, 2012.
TW patent application No. 094141908, Search Report mailed Mar. 19, 2012.
U.S. Appl. No. 12/082,320, Office Action mailed Apr. 13, 2011.
U.S. Appl. No. 12/082,320, Office Action mailed Nov. 9, 2011.
U.S. Appl. No. 12/082,320, Office Action mailed Mar. 28, 2012.
U.S. Appl. No. 10/061,127, Office Action mailed Jun. 23, 2004.
U.S. Appl. No. 10/061,127, Notice of Allowance mailed Jan. 5, 2005.
U.S. Appl. No. 10/724,558, Notice of Allowance mailed Sep. 9, 2004.
U.S. Appl. No. 11/042,788, Office Action mailed Jan. 16, 2007.
U.S. Appl. No. 11/042,788, Office Action mailed Jan. 31, 2008.
U.S. Appl. No. 11/042,788, Office Action mailed Sep. 3, 2008.
U.S. Appl. No. 11/042,788, Office Action mailed Oct. 30, 2008.
U.S. Appl. No. 11,042,788, Notice of Allowance mailed Mar. 9, 2009.
U.S. Appl. No. 09/626,629, Office Action mailed May 9, 2002.
U.S. Appl. No. 09/626,629, Notice of Allowance mailed Aug. 13, 2002.
U.S. Appl. No. 10/273,812, Office Action mailed Nov. 30, 2004.
U.S. Appl. No. 10/273,812, Office Action mailed Mar. 21, 2005.
U.S. Appl. No. 10/273,812, Notice of Allownce mailed Aug. 3, 2005.
U.S. Appl. No. 11/260,009, Office Action mailed Feb. 17, 2006.
U.S. Appl. No. 11/260,009, Notice of Allowance mailed Apr. 28, 2006.
U.S. Appl. No. 11/471,774, Notice of Allowance mailed Oct. 30, 2007.
U.S. Appl. No. 12/027,183, "Structures and fabrication techniques for solid state electrochemical devices," Visco et al., filed Feb. 6, 2008.
EP1228546, "Structures and fabrication techniques for solid state electrochemical devices," Visco et al., Aug. 7, 2002, abstract.
Seabaugh et al., "Low-cost fabrication processes for solid oxide fuel cells," NexTech exhibited at the Fuel Cells 2000 Conference in Protland, Oct. 30, 2000-Nov. 2, 2000, NexTech Materials, Ltd.
Fujii et al., "Manufacturing and characterization of metallic system support tube for solid oxide fuel cells," Bulletin of the Electrotechnical Laboratory, vol. 62, No. 1-2, 1998, p. 1319.
Momma et al., "High potential performance of tubular type SOFC using metallic system components," Electrotechnical Laboratory, Electrochemical Proceedings vol. 97-40, Jun. 1997, pp. 310-321.
Okuo et al., "Development of metallic substrate tubular SOFC," Electrotechnical Laboratory, Oct. 1994, pp. 908-919.
Okua et al., "Improvement in power stability and durability demonstration on new tubular type SOFC using metallic system component," vol. 60, No. 5, 1996, pp. 1-9.
Schiller et al., "Development of metallic substrate supported thin-film SOFC by applying plasma spray techniques," Electrochemical Society Proceedings, vol. 99-19, Oct. 1999, pp. 892-903.
Schiller et al., "Development of plasma sprayed components for a new SOFC Designs," Electrochemical Proceedings, vol. 97-40, Oct. 1999, pp. 634-645.
Schiller et al., "Development of SOFC components by vacuum plasma spraying," 1998, pp. 515-518.
Takenoiri et al., "Development of metallic substrate supported planar SOFC at Fuji Electric," Fuel Cell Seminar Bastracts, Nov. 1998, pp. 84-87.
Unal, et al., "Microstructures of $Y_2O_3$-Stabilized $ZrO_2$ Electron Beam-Physical Vapor Deposition Coatings on Ni-Base Superalloys", Department of Materials Science and Engineering, vol. 984-92, 1994, pp. 984-992.
Wallin, et al., "Cofired Solid Oxide Fuel Cells for Operation at 800°C", 1997, Abstract.
Yao, et al, "Improved preparation procedure and properties for a multiplayer piezoelectric thick-film actuator", Sensors and Actuators A 71, Received Dec. 9, 1997; received in revised form Apr. 27, 1998; accepted May 1, 1998, pp. 139-143.
"Mfg. Oxygen Sensor—Involves Applying Catalyst Metal Salt Soln. To Sintered Electrolyte, Reducing, Firing, Again Applying Metal Salt Soln. And Firing", Matsushita Elec Ind Co Ltd [MATU], 1979JP-0078760 (Jun. 21, 1979), (abstract), pp. 1-2.
CN patent application No. 200880128414.5, First Office Action issued Mar. 20, 2012.
PH patent application No. 12008502790, Office Action mailed Apr. 27, 2012.
RU patent application No. 2010105992/07, Office Action mailed Apr. 4, 2012.
PH patent application No. 12010500175, Office Action mailed May 23, 2012.
CN patent application No. 200680055443.4, Third Office Action mailed Apr. 16, 2012.
U.S. Appl. No. 11/791,258, Office Action mailed Jun. 7, 2012.
Ishihara et al., "Electrophoretic deposition of Y2O3-stabilized ZrO2 electrolyte films in solid oxide fuel cells," J. Am. Ceram. Soc. 79 (4) 913-19 (1996), Jan. 26, 1995.
Ishihara et al., "Electrophoretic deposition of Y2O3-stabilized ZrO2 on the porous La0.8Sr02MnO3 cathode substrate for SOFC," Proceedings of the 4th International Symposium on Solid Oxide Fuel Cells, Electrochemical Society, 1995.

* cited by examiner

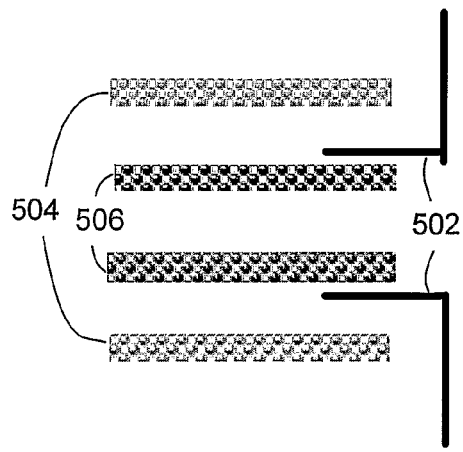
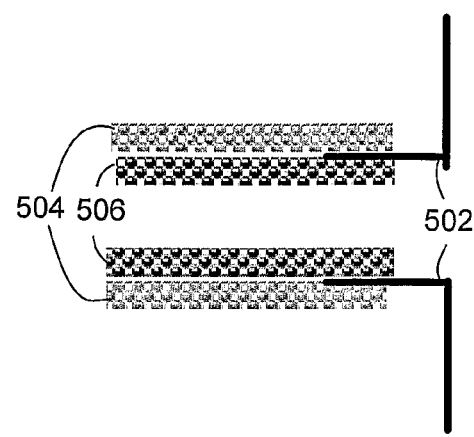
FIG. 5A  FIG. 5B
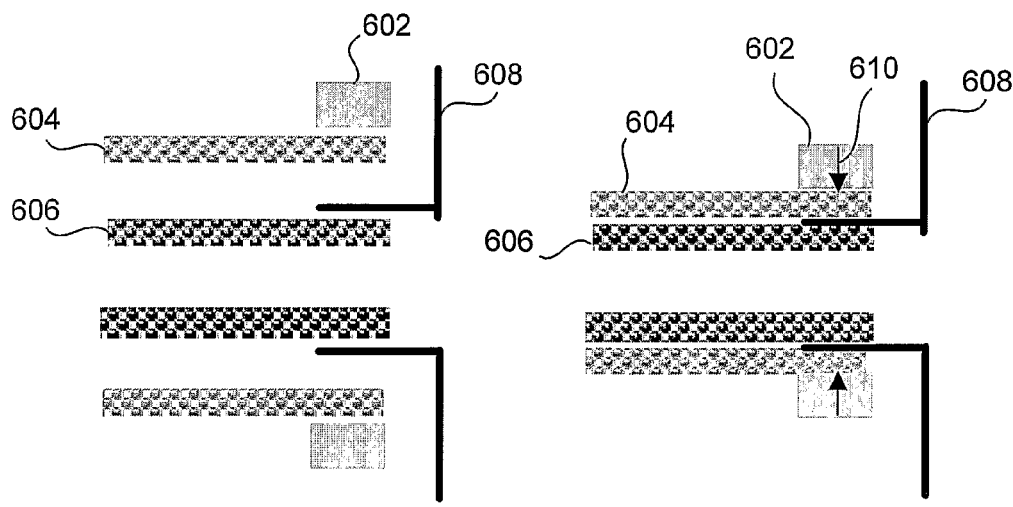
FIG. 6A  FIG. 6B

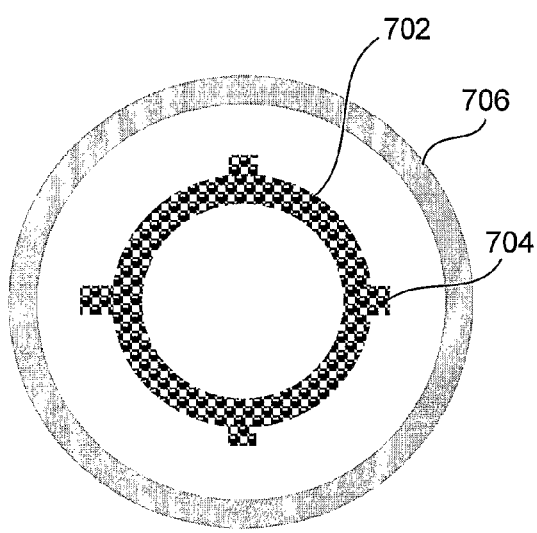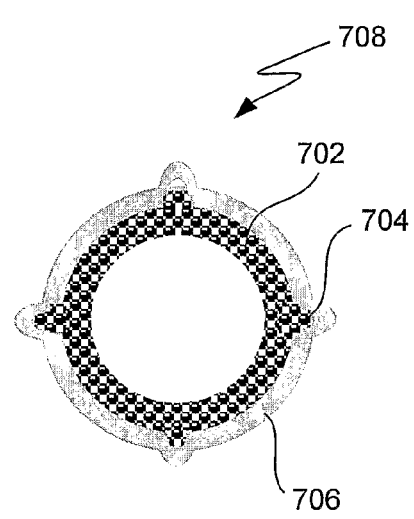
FIG. 7A     FIG. 7B

JOINED CONCENTRIC TUBES

STATEMENT OF GOVERNMENT SUPPORT

This invention was made with government support under Contract DE-AC02-05 CH11231 awarded by the United States Department of Energy to The Regents of the University of California for the management and operation of the Lawrence Berkeley National Laboratory. The government has certain rights in this invention.

FIELD OF THE INVENTION

The present invention relates to the joining of concentrically disposed tubular objects and has important applications in high-temperature electrochemical devices, such as solid oxide fuel cells. The invention is relevant to any situation where tubular objects are produced by a method in which one tube shrinks radially on another upon sintering during manufacture, and the resulting object has properties that vary in the radial direction.

BACKGROUND

Solid-state electrochemical devices are normally cells that include two porous electrodes, the anode and the cathode, and a dense solid electrolyte membrane disposed between the electrodes. In the case of a typical solid oxide fuel cell, for example, the anode is exposed to fuel and the cathode is exposed to an oxidant in separate closed systems to avoid any mixing of the fuel and oxidants.

The electrolyte membrane is normally composed of a ceramic oxygen ion conductor in solid oxide fuel cell applications. In other implementations, such as gas separation devices, the solid membrane may be composed of a mixed ionic electronic conducting material ("MIEC"). The porous anode may be a layer of a ceramic, a metal or a ceramic-metal composite ("cermet") that is in contact with the electrolyte membrane on the fuel side of the cell. The porous cathode is typically a layer of a mixed ionically and electronically-conductive (MIEC) metal oxide or a mixture of an electronically conductive metal oxide (or MIEC metal oxide) and an ionically conductive metal oxide.

Solid oxide fuel cells normally operate at temperatures between about 650° C. and about 1000° C. to maximize the ionic conductivity of the electrolyte membrane. At appropriate temperatures, the oxygen ions easily migrate through the crystal lattice of the electrolyte.

Since each fuel cell generates a relatively small voltage, several fuel cells may be associated to increase the power output of the system. Such arrays or stacks generally have a tubular or planar design. Planar designs typically have a planar anode-electrolyte-cathode deposited on a conductive interconnect and stacked in series. However, planar designs are generally recognized as having significant safety and reliability concerns due to the complexity of sealing of the units and manifolding a planar stack. Tubular designs utilizing long porous support tubes with electrodes and electrolyte layers disposed on the support tube reduce the number of seals that are required in the system. Fuel or oxidants are directed through the channels in the tube or around the exterior of the tube.

The manufacture of concentric tubular structures with multiple layers that display varying properties to accomplish such tubular fuel cell designs is routine, especially in the field of high temperature electrochemical devices. Bonding between the layers is typically achieved through chemical or sinter bonding. This limits the types of materials that can be bonded to one another. For example, a ceramic layer and metal layer generally will not bond to each other easily by chemical or sintering means. Additionally, the desirable opportunity to inspect the outside of an internal concentric layer before applying an external concentric layer is not available in conventional manufacturing schemes where all of the layers are produced as a single green body and subsequently co-sintered.

Thus, improved techniques for joining concentric tubular structures suitable for use in devices operating at high temperatures are needed.

SUMMARY OF THE INVENTION

The present invention addresses this need by providing a method of joining concentric tubular structures to form a composite tubular structure. The method involves concentrically disposing an inner tubular structure and an outer tubular structure, and sintering the concentrically disposed tubular structures so that the outer tubular structure radially shrinks and mechanically joins to the inner structure to form the composite tubular structure.

The invention facilitates the manufacture of tubular objects having two or more concentric layers that have different properties. The layers are joined to one another during their manufacture primarily by compressive and friction forces and possibly mechanical interlocking; it is not necessary for the concentric tubes to display adhesive-, chemical- or sinter-bonding to each other in order to achieve a strong bond. This facilitates joining of dissimilar materials, such as ceramics and metals. A further benefit of the invention is the opportunity for inspecting the outside of an internal concentric layer before applying an external concentric layer. This allows an opportunity for quality assurance of the internal concentric layer. This is not possible in a manufacturing scheme where all of the layers are produced as a single green body and subsequently co-sintered.

Also, the method of manufacture enables the incorporation of additional structures between the inner and outer structures that are then joined together to form more complex structures.

These and other features and advantages of the invention are described in further detail and with reference to the drawings in the description that follows.

BRIEF DESCRIPTION OF THE DRAWINGS

FIGS. 5A-B illustrate an embodiment of an aspect of the invention wherein the radial compressive sintering force can be used to capture items between the internal and external tubular structures.

FIGS. 6A-B illustrate an embodiment of an aspect of the invention wherein the radial compressive force associated with shrinkage of the external tube around the internal tube is supplemented by a further tube or ring.

FIGS. 7A-B illustrate an embodiment of an aspect of the invention wherein the mechanical interlocking between the external and internal tubes is increased when the surface of the internal tube has protrusions.

DETAILED DESCRIPTION

Figure 1:
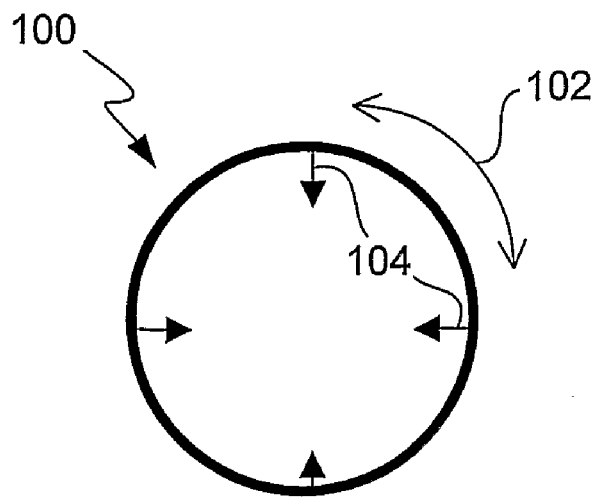
FIG. 1 illustrates a cross-sectional view of a tube experiencing free sintering.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the scope of the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The invention provides a method of joining concentric tubular structures to form a composite tubular structure. The method involves concentrically disposing an inner tubular structure and an outer tubular structure, and sintering the concentrically disposed tubular structures so that the outer tubular structure radially shrinks and mechanically joins to the inner structure to form the composite tubular structure. The invention facilitates the manufacture of tubular objects having two or more concentric layers that have different properties. The tubes do not need to be of circular cross-section. The layers are joined to one another during their manufacture primarily by compressive and friction forces and possibly mechanical interlocking; it is not necessary for the concentric tubes to display adhesive-, chemical- or sinter-bonding to each other in order to achieve a strong bond. This facilitates joining of dissimilar materials, such as ceramics and metals.

The invention is usefully applied in the fabrication of high-temperature electrochemical devices, such as solid oxide fuel cells, and is primarily described herein in the context of this embodiment. Electrochemical cells generally comprise an ion-conducting electrolyte between a porous anode and cathode, each with its respective current collector. Although a fuel cell is used as an example of an electrochemical cell for purposes of illustration, the invention is not so limited, and it will be understood that the electrochemical cell may be an oxygen generator, syn-gas generator or hydrogen gas separator or other similar electrochemical device.

The following common material abbreviations, used in the art, are sometimes used in the description that follows:

"YSZ" $(ZrO_2)_x(Y_2O_3)_y$ where ($0.88 \geq X \geq 0.97$) and ($0.03 \leq y \leq 0.12$). The preferred material is $(ZrO_2)_{0.92}(Y_2O_3)_{0.08}$ or $(ZrO_2)_{0.90}(Y_2O_3)_{0.10}$ that are available commercially.

"SSZ" $(ZrO_2)_{1-2x}(Sc_2O_3)_x$, $(ZrO_2)_{1-2x}(Sc_2O_3)_{x-z}(Y_2O_3)_z$ or $(ZrO_2)_{1-2x-z}(Sc_2O_3)_x(CeO_2)_z$ ($0<X \leq 0.25$) ($0<z \leq 0.1$). Preferred SSZ materials include $(ZrO_2)_{0.9}(Sc_2O_3)_{0.05}$, $(ZrO_2)_{0.9}(Sc_2O_3)_{0.045}(Y_2O_3)_{0.005}$, and $(ZrO_2)_{0.9}(Sc_2O_3)_{0.05}(CeO_2)_{0.01}$.

"LSM" $La_{1-x}Sr_xMn_yO_{3-\delta}$ ($1 \geq X \geq 0.05$) ($0.95 \leq y \leq 1.15$) ($\delta$ is defined as that value signifying a small deviation from perfect stoichiometry). Preferred LSM materials include $La_{0.8}Sr_{0.2}MnO_3$, $La_{0.65}Sr_{0.30}MnO_{3-\delta}$, and $La_{0.45}Sr_{0.55}MnO_{3-\delta}$.

"SYTO" $Sr_{1-x}Y_zTiO_{3-\delta}$ ($0.5 \geq X \geq 0$) ($0 \leq Z \leq 5$) ($\delta$ is defined as that value signifying a small deviation from perfect stoichiometry). Preferred SYTO materials include $Sr_{0.88}Y_{0.08}TiO_3$.

"CGO" $(CeO_2)_{1-2x}(Gd_2O_3)_x$ ($0<X \leq 0.25$). Preferred CGO materials include $Ce_{0.8}Gd_{0.2}O_{1.9}$ and $Ce_{0.9}Gd_{0.1}O_{1.95}$ "LSGM" $La_{0.8}Sr_{0.2}Ga_{0.85}Mg_{0.15}O_{2.825}$ The invention is conceptually illustrated in FIGS. 1 and 2. Porous tubular bodies experience radial shrinkage during sintering. The invention exploits this shrinkage to join concentric tubes to one another. During sintering of a free-standing porous tubular object 100, the object shrinks along the length of the tube and in the plane of the cross section. Both the perimeter and diameter of the cross-section are reduced during sintering, as indicated by arrows 102 and 104, respectively, in FIG. 1. The shrinkage generally increases with time or increasing sintering temperature. The radial shrinkage is accompanied by a compressive sintering force in the radial direction. This force can be utilized to create a very tight fit between concentric tubes such that the tubes become mechanically bonded to each other. In essence, the outer tube can be "shrink-wrapped" onto the inner tube.

In the case of a tubular solid oxide fuel cell, it is desirable to have the external current collector ("CC") in intimate contact with the external electrode. The CC provides a low-resistance electrical connection for exchanging electrons with the surface of the electrode, and the interface between CC and electrode must tolerate thermal cycling, mechanical vibration, etc. Therefore, both electrical and mechanical connection between the CC and electrode must be robust. The radial compressive sintering force associated with sintering the CC in accordance with the present invention can provide this connection.

Figure 2:
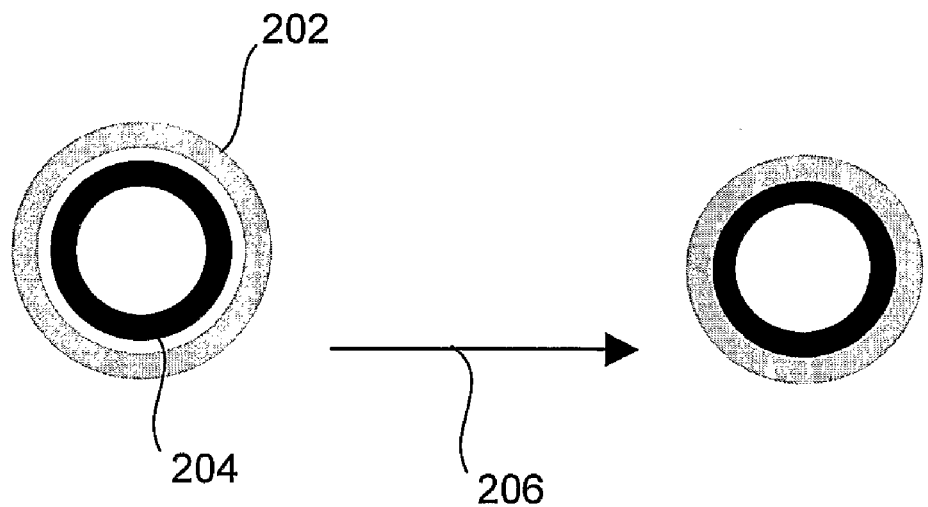
FIG. 2 illustrates a cross-sectional view of an external tube sintered onto a pre-sintered internal tube, in accordance with the present invention.

FIG. 2 illustrates, in cross-section, the method of the invention for creating joined concentric tubular structures. The outer structure can be pressed, wrapped, slid over or otherwise concentrically disposed about the inner structure prior to sintering. Prior to sintering, the outer structure may be in mechanical contact with the inner structure, but there is no robust bond between the two. The external CC 202 is shrink-fitted onto the cell body 204 by sintering, represented by arrow 206.

Figure 3A:
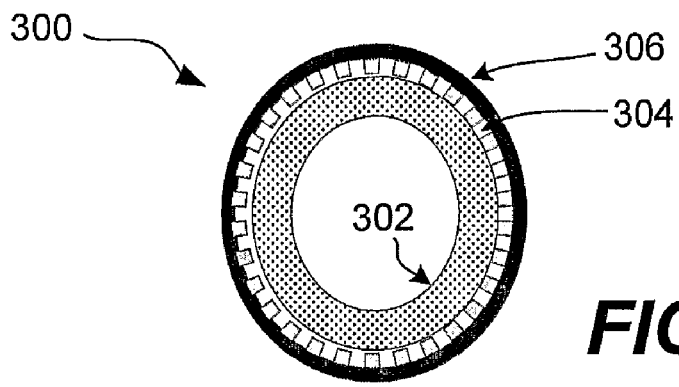
FIGS. 3A-D show cross-sectional schematic views of a tubular structure, in this case a SOFC, prepared in accordance with the present invention.
Figure 3B:
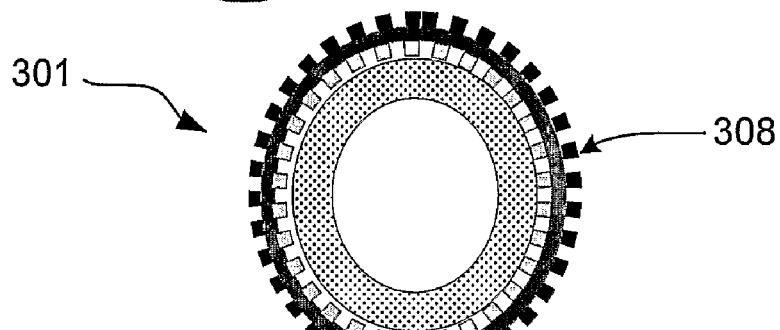

FIGS. 3A-D show cross-sectional schematic views of a tubular structure, in this case a SOFC, prepared in accordance with the present invention. In FIG. 3A, a tri-layer tube 300 composed of the internal CC 302 (e.g., porous metal, porous ceramic, or porous cermet), internal electrode 304 (e.g., porous LSM/YSZ, porous Ni/YSZ, or porous YSZ to be infiltrated with catalyst after cell preparation), and electrolyte 306 (e.g., porous YSZ that sinters dense) is co-sintered. In FIG. 3B, the external electrode 308 (e.g., porous LSM/YSZ, porous Ni/YSZ, or porous YSZ to be infiltrated with catalyst after cell preparation) is then applied to the outer surface of the electrolyte 306. Alternatively, the external electrode may be applied prior to the sintering described with reference to FIG. 3A.

Figure 3C:
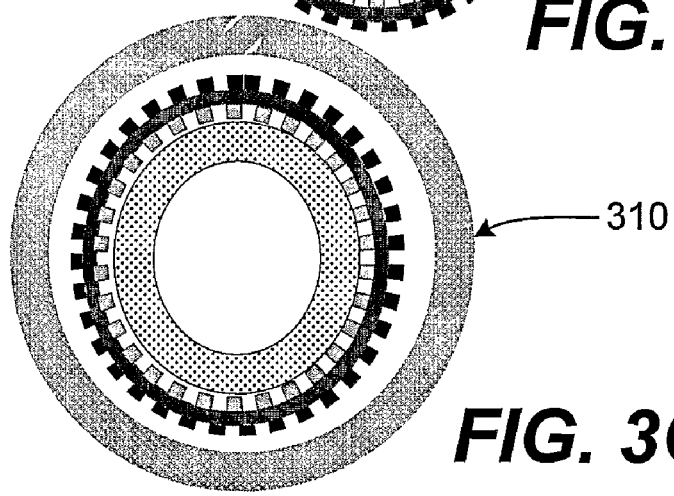
Figure 3D:
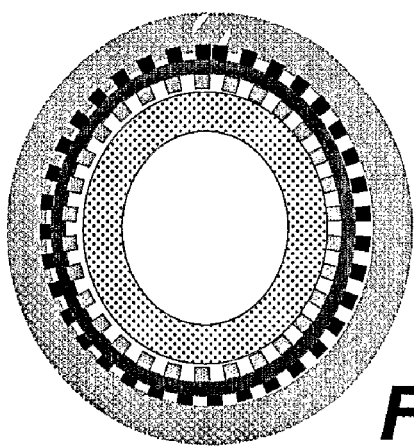

FIGS. 3C and 3D illustrate a primary aspect of this invention. In FIG. 3C, a green external CC tube 310 (e.g., porous metal) is placed around the internal tubular structure 301 in a concentric arrangement. The concentric tubes are then fired during which the external CC 310 sinters and shrinks onto the external electrode 308, producing the structure illustrated in FIG. 3D. In the case of a stainless steel external CC tube, firing (sintering) can be accomplished in a vacuum or reducing atmosphere (e.g., 4% H2/96% Ar) at 900-1400° C. (1200-1300° C. preferred) for 0.5-5 h (2-4 h preferred).

It is possible to apply an additional layer of material either to the outside of the external electrode or to the inside of the external CC before sintering the external tube onto the internal tube. If this layer is composed of a fine, conductive material (e.g., LSM, LaCrO3, Pr2NiO4, metal particles <25 micrometers in diameter such as Ag, Au, Cu, Mo, Pt, FeCr, NiCr, and alloys thereof, etc) the electrical connection between the external electrode and the external CC can be improved. Furthermore this layer can block chemical interaction between the electrode material and the CC material. For instance it may be desirable to block transport of Cr species from a NiCr or FeCr-based CC onto the electrode.

If the internal tubular structure shrinks less than the external CC upon exposure to the same sintering protocol, it is possible to co-sinter both tubes in a single step. In such a case, both tubes will shrink at the same time but the external tube will shrink more, and therefore compress against the internal tube.

Implementation of this invention involves appropriate sintering protocols and selected porosities for each of the concentric tubes, such that the appropriate shrinkage associated with such porosities and sintering protocols to obtain the desired result is achieved. For instance, when the external tube functions as a current collector in an electrochemical device it must comprise (a) sufficient pore space to allow passage of reactant and product streams and (b) particles that are well-connected so as to ensure mechanical integrity and efficient current collection. During the sintering step, the external tube first undergoes free sintering and shrinks until it contacts the internal tube, after which it undergoes constrained sintering.

The initial gap between the external and internal tubes is chosen to be small enough so that the radial shrinkage during free sintering closes the gap and ensures contact of the internal and external tubes. Suitable gaps depend upon the free sintering properties of the materials involved and will be readily ascertainable to those skilled in the art given the parameters provided herein. Generally, a suitable gap is in the range of about 0-32% or preferably 0-18% of the internal diameter of the external tube.

During the free sintering and constrained sintering periods, the morphology of the external tube evolves. In general, the particles sinter to one another and the pore volume is reduced. Therefore, where a porous external tube is desired in the final product, such as in the case of a SOFC CC, it is critical to control the green density of the external tube to be low enough to allow this loss of pore volume during sintering while maintaining sufficient pore space in the final structure. The green density of the external tube must be high enough, however, to ensure handling strength of the green external tube. The extent of radial shrinkage, particle-to-particle sintering, and loss of pore volume can be tuned by the parameters of the sintering protocol, including heating rate, sintering temperature, and sintering time. Generally, increased sintering temperature and/or sintering time lead to increased radial shrinkage, increased particle sintering, and loss of pore volume. Suitable parameters for the materials selection and sintering process will be readily ascertainable to those skilled in the art given the disclosure herein. The example that follows below provides an illustration of some of these parameters.

Figure 4:
FIG. 4 is a magnified image of the interface of the tubular components of a solid oxide fuel cell prepared according to the method of the present invention described with reference to FIGS. 3A-D.

FIG. 4 is a magnified (×1000) cross-sectional image of the interface of the tubular components of a solid oxide fuel cell prepared according to the method of the present invention described with reference to FIGS. 3A-D. The external CC 402 (outer tubular structure) was well bonded to the internal tubular structure (external electrode 404, electrolyte 406, internal electrode 408 and internal CC 410). Mechanical interlocking between metal particles of the external CC 402 and the YSZ particles of the external electrode 404 is visible in the region indicated by the arrows in FIG. 4. Note that for this particular set of materials, there is no chemical bonding or sinter-bonding between the external CC 420 and external electrode 404. The bond is achieved solely by the radial compressive force causing intimate contact between these layers during shrinking and sintering of the external CC 402.

In general for a SOFC implementation of the invention, the internal and external CCs can be porous metal (e.g., FeCr, NiCr, Ni, Cu, Ag, Au, etc., alloys based on FeCr, NiCr, Ni, Cu, Ag, Au, etc, and mixtures of these) or cermet (e.g., Ni/YSZ, Cu/YSZ, NiCr/YSZ, Ni/SSZ, Cu/SSZ, NiCr/SSZ, Ni/CGO, SYTO/YSZ, etc.); the electrolyte is ceramic (e.g., YSZ, SSZ, CGO, LSGM, etc.); and the electrodes may be metal, cermet or ceramic (e.g., Ni, Co, Ru, Cu, Pt, Ag, $CeO_2$, Cu/YSZ, Ni/YSZ, LSM(YSZ, etc.). For instance, some preferred embodiments of the invention include joining an external metallic current collector tube onto an internal tube comprising (a) an anode-supported structure (e.g., thin YSZ electrolyte on Ni/YSZ support), (b) an electrolyte-supported structure (e.g., thin internal electrode and thick YSZ support), or (c) a metal-supported structure (e.g., thin YSZ electrolyte and thin internal electrode on stainless steel support). In addition, the external electrode can be applied during or after fabrication of the cell structure, or can be applied by infiltration or other means after the external CC is applied.

It is possible to supplement the mechanical bonding achieved in accordance with the present invention by the use of decorated materials, as described in commonly assigned International Application No. PCT/US2005/043109, incorporated herein by reference. For example, an outer tubular structure composed of metal (e.g., FeCr, NiCr, Ni, Cu, etc., alloys based on FeCr, NiCr, Ni, Cu, etc., and mixtures of these) decorated with ceramic (e.g., YSZ) particles may form a sinter bond in addition to the mechanical joining provided by the present invention. According to this method, the metal's surface is decorated with particles of ceramic to produce a composite. Decoration involves mechanically embedding, impregnating, pushing, or forcing or otherwise bonding a less ductile material into the surface of a more ductile material. For instance, the surface of a metal body or particle can be decorated with ceramic particles by pushing the ceramic into the surface of the metal. The metal will deform around the ceramic particle, and friction, stress, and/or mechanical interlocking will prevent the ceramic particle from being easily removed from the metal surface. The decoration generally partially covers the decorated surface, for example between about 10-80% of the surface area of a more ductile material is decorated with a less ductile material. Some specific useful sub-ranges are 30-60%, about 50%, or about 20-30% surface area coverage. During sintering of the concentrically disposed tubes, the outer tubular structure both shrinks to mechanically bond with the inner tubular structure, and the ceramic decoration on the outer tubular structure sinter bonds to ceramic (e.g., the outer electrode or electrolyte) of the inner tubular structure to form an even more robust bond. This joining method is suitable for joining dissimilar materials that are chemically inert towards each other (e.g., metal and ceramic), while resulting in a strong bond with a sharp interface between the two materials. A binder, such as hydroxypropylcellulose (HPC), may be added to the mixing medium during decoration in order to form agglomerates of the decorating material on the surface of the decorated material in order to enhance sinter bonding.

It is also possible to supplement the mechanical bonding achieved in accordance with the present invention by the use of braze material. For instance, a braze can be disposed on the inside of the external tube, outside of the internal tube, or between the two tubes. During firing of the external tube onto the internal tube, the braze melts and bonds to the internal and external tubes, creating a strong joint between the tubes. The braze can also provide a sealed area between the tubes. Of course the braze does not need to extend the full length of the tubes, but rather may be disposed in limited areas, e.g., in a band near the end of the tubes. Suitable brazes include, but are not limited to, those based on Ag, Au, Cu, Ni, Ti, Pd, Pt, Cr and their alloys. Additional elements such as Ti, Hf, V, Zr, etc may be present in the braze to promote wetting of ceramic surfaces. For example, a Ti-containing Ag—Cu braze can be disposed between an inner tube with a YSZ exterior surface and an external tube comprised of metal, resulting in improved bonding and sealing between the two tubes.

Of course, it is also possible for any or all of the electrode/electrolyte/bonding/brazing/conductive layers to be applied to the inside of the external tube, and shrink onto the internal tube. It is also possible for all or part of the metal tubes to be of an appropriate material such that it becomes dense after sintering. This is desirable for creating a seal, fitting, flange, manifold, etc., or providing a high-conductivity contact area for exchanging current in or out of the cell.

As noted above, when an external tube shrinks to the point that it touches an internal tube, the sintering of the external tube becomes constrained. Therefore, the total shrinkage of the external tube will be less than it would be in the free-sintering case (i.e., if its shrinkage were not constrained by the internal tube). By choosing the gap width between the internal tube and the green external tube, the shrinkage (or amount of free vs. constrained sintering) of the external tube can be controlled. This can be useful in controlling the properties of the sintered external tube. For instance, density of a sintered body increases with total shrinkage for a given green density. Therefore by choosing a small gap width, the external tube will shrink a small amount, thereby retaining a lower density than would be achieved if the external tube were allowed to free-sinter.

Controlling the total shrinkage could also be useful when co-sintering layers that display different free-sintering shrinkages. For example, a thin porous green ceramic layer could be supported on a porous metal green tube. If the shrinkage required to densify the ceramic film is much less than the free-sintering shrinkage of the metal support, significant compressive stress could develop in the ceramic film as the metal support continues to sinter after the film has become dense. Such stress could cause warping or other defects in the ceramic film. By inserting an internal tube that is larger than the free-sintered ID of the ceramic/metal green structure, the shrinkage of the green structure can be limited to a value near that required for densification of the ceramic film.

According to another aspect of the invention, the radial compressive sintering force can also be used to capture items between the internal and external tubular structures. An embodiment of this aspect of the invention is illustrated in longitudinal cross-section in FIGS. 5A-B. Fitting(s) 502 is disposed between an external tubular member 504 (e.g., a porous metal current collector) and an internal tubular member 506 (e.g., a fuel cell electrode/electrolyte structure as depicted in FIG. 3B) tubes before sintering. After sintering, the fitting 502 is captured between the internal 506 and external 504 tubes, as depicted in FIG. 5B. This technique can be used to join tubular structures to each other or to a support housing, or be used to provide fluid manifolding into the internal tube.

Preferably, the fitting 502 undergoes some shrinkage itself during sintering. such that the fitting shrinks onto the internal tube and the external tube shrinks onto the fitting. This enhances the solidity of the capture of the fitting between the tubes. A slightly porous green fitting that sinters to full density during shrinkage is preferred because it has a loose fit around the internal tube 506 before sintering, but can be gas-tight after sintering. Alternatively, in some circumstances, a fitting with a very tight fit onto the internal tube, but that does not shrink during sintering, may be used.

In a further alternative, the fitting and external tube can be a single member. For instance the external tube can be constructed such that the main body of the tube remains porous after sintering but the edge of the tube can become dense during sintering, essentially becoming useful as a fitting. Of course the thicknesses of the main body of the tube and the fitting region need not be the same. The fitting area can include a protrusion, flange, etc. which becomes dense during sintering. Thus in a single step the porous external tube and fitting can be joined to the internal tube. In the case where the internal tube shrinks during firing, such a fitting can be an integral part of the internal tube as well. Furthermore, a hermetic seal can be achieved if a braze is disposed between the tubes in an area where both of the tubes are dense after firing. These options are particularly attractive when at least one of the dense areas is a metal. A suitable metal may be FeCr, NiCr, Ni, Ag, Cu, and alloys and mixtures thereof.

According to another aspect of the invention, depicted in FIGS. 6A-B, the radial compressive force associated with shrinkage of the external tube around the internal tube 606 may be supplemented, such as in a situation where the basic force provided by shrinkage of the external tube 604 is not sufficient to provide a good bond between the external and internal tubes, or between the tubes and a fitting(s) 608. Additional radial compressive sintering force can be provided by a further tube or ring of a material 602 that has a free shrinkage or radial compressive force during sintering which is higher than that of the external tube 604. If such a tube or ring 602 is disposed outside of the external tube 604, it can help force the tubes and/or fitting(s) together during sintering. The further tube or ring 602 could be removed after sintering, or left in place if it does not disturb the functioning of the tubular device.

FIGS. 6A-B show this aspect of the invention before and after sintering, respectively. A ring/tube 602 of material that displays a high shrinkage and/or high radial compressive force during sintering is used to aid compression around a fitting 608 disposed between an external green tubular structure 604 and an internal tubular structure 606. The arrows 610 represent the compressive force provided by the ring/tube 602. The ring/tube 602 can also be extended along the length of the external tube 604 to provide extra compressive force to join the internal 604 and external 606 tubes.

According to a further aspect of the invention, depicted in FIGS. 7A-B, the mechanical interlocking between the external and internal tubes can be increased if the surface of the internal tube is not smooth. For instance, the surface of the internal tube can have protrusions, ribs, ridges, corrugation, indentation, etc. As it shrinks, the external tube deforms around the features of the internal tube, providing mechanical interlocking. One such scenario is depicted in FIGS. 7A-B. FIG. 7A depicts an internal tube 702 with protrusions 704 disposed inside an external tube 706 before sintering in accordance with the present invention. FIG. 7B shows the composite tubular structure 708 following sintering. The external tube 706 conforms to the protrusions 704 after shrinkage, providing mechanical locking so that the tubes cannot rotate or slide with respect to one another.

EXAMPLE

The following example is provided to illustrate and provide structural and performance details for a specific embodiment of the present invention. The example is provided to exemplify and more clearly illustrate aspects of the present invention and is in no way intended to be limiting.

The method for achieving the structure presented in FIG. 4 will be described. In this case, the internal tube comprised a porous metal support layer (internal CC), internal electrode, and dense YSZ electrolyte. The external electrode was applied as a paint to the internal tube before inserting the internal tube into the external tube. The paint consisted of YSZ powder, aqueous acrylic binder, and polymethyl methacrylate pore former particles. The external tube (external CC) was debinded, bisque fired, and slipped around the internal tube prior to sintering the two tubes together. During sintering, the intimate contact between the external electrode and external CC that is evident in FIG. 4 was obtained, and the external electrode sintered onto the electrolyte of the internal tube. Note that the debinding and bisque firing steps are optional and generally depend on the choice of binder and type of handling required before sintering the external tube. The internal tube was previously sintered at 1300° C. before the steps described here. Therefore the internal tube shrank very little (<2%) during the sintering of the external tube.

The following table illustrates some parameters of the green external tube, sintering process, and resulting external tube. The external tube was prepared to fit concentrically around the internal tube, which was 0.9 cm outside diameter.

| Green Tube | | Sintering Protocol | | Final Tube | |
|---|---|---|---|---|---|
| Particle size | 45-53 micrometers | Heating rate | 200 C./hr | Metal density | 70% |
| Metal density | 44% | Sintering tempurature | 1275 C. | Pore volume | 30% |
| Tube ID | 1.00 cm | Sintering time | 4 h | Tube ID | 0.9 cm |
| Gap to internal tube | 0.05 cm | Sintering atmosphere | 4% H2/96% Ar | Gap to internal tube | 0 cm |

The external tube was prepared from water-atomized 434 alloy stainless steel particles, 45-53 micrometers in size. The particles were mixed with acrylic binder (aqueous solution of 15 wt % acrylic) and pore former (polyethyle glycol 300) in a ratio of 10 g metal:2 g acrylic solution:2 g pore former. The resulting mixture was dried, ground, and sieved to <150 μm agglomerate size. The resulting powder was loaded into a tubular mold and isostatically pressed at 20 kpsi. The diameter of the mandrel of the mold was chosen to impart an internal diameter to the external tube that was larger than the outside diameter of the internal tube. A section of the green compacted tube was cut into a length similar to that of the internal tube. The green tube was then debinded in air at 525° C. for 1 h (0.5° C./min heating rate) to remove the acrylic and polyethelyene glycol 300. The tube was then bisque fired in reducing atmosphere (4% H2/96% Ar) at 1000° C. for 2 h (200° C./hr heating rate). During the bisque firing, the tube sintered minimally, gaining handling strength but shrinking less then 3%.

After bisque firing, the external tube was slipped around the internal tube (with painted outside electrode) and both were sintered together according to the protocol in the table above. During sintering, the painted outside electrode sintered onto the internal tube electrolyte, and the external tube shrank onto the internal tube, creating a mechanical bond and intimate contact between the external tube and outer layer of the internal tube.

Similar results have been achieved with a mixture of metals as the external tube. For instance, 90 wt % 434 alloy/10 wt % Cu has successfully replaced pure 434 alloy in the example above. This method can be extended to a wide range of metal or cermet external tubes by adjusting, for example, the sintering protocol.

In this example, the catalyst (e.g., LSM) for the external electrode can be infiltrated after sintering the external tube onto the internal tube. The infiltration can be accomplished for instance by a technique such as set forth in co-pending International Application No. PCT/US2006/015196, incorporated herein by reference: A method of forming a composite (e.g., a mixed electrode) by infiltration of a porous structure (e.g., one formed from an ionically conductive material) with a solution of a precursor (e.g., for an electronically conductive material) results in a particulate layer on and within the porous structure with a single infiltration. The method involves forming a solution comprising at least one metal salt and a surfactant; heating the solution to substantially evaporate solvent and form a concentrated salt and surfactant solution (e.g., to between about 70 and 130° C.); infiltrating the concentrated solution into a porous structure to create a composite; and heating the composite to substantially decompose the salt and surfactant to oxide and/or metal particles (e.g., to greater than 500° C., but below 1000° C., for example 800° C.). The result is a particulate layer on the pore walls of the porous structure. In a preferred embodiment, the particulate layer is a continuous network. This is beneficial because the catalyst does not need to be exposed to the high temperature reducing conditions required for sintering the external tube.

Similar structures to the one shown in FIG. 4 have been thermally cycled between 100-700° C., and oxidized in air for >90 h at 700° C. with no loss of contact between the external and internal tubes.

Stainless steel external current collector tubes have been similarly applied by the method described above to anode-supported and electrolyte-supported tubular SOFC structures. The anode-supported tube comprised a thin, dense YSZ electrolyte (about 25 micrometers thick) supported on Ni/YSZ (about 1 mm thick). The electrolyte-supported tube comprised a dense YSZ electrolyte layer (about 1 mm thick) with thin internal electrode (about 25 micrometers thick). In both cases the external electrode was painted onto the exterior surface of the internal tube before firing the stainless steel external tube on. The stainless steel external tube was well-joined to the internal tube in the case of both anode-supported and electrolyte-supported internal tubes. It is clearly possible to additionally use this method to apply an external current collector tube to a cathode-supported cell structure.

Similar structures to those described have been produced with a variety of dimensions for the height and diameter of the internal tube and external tube, and the resulting gap between the two before sintering the external tube.

CONCLUSION

Thus, the invention facilitates the manufacture of tubular objects having two or more concentric layers that have different properties. The layers are joined to one another during their manufacture primarily by compressive and friction forces and possibly mechanical interlocking; it is not necessary for the concentric tubes to display adhesive-, chemical- or sinter-bonding to each other in order to achieve a strong bond. This facilitates joining of dissimilar materials, such as ceramics and metals. A further benefit of the invention is the opportunity for inspecting the outside of an internal concentric layer before applying an external concentric layer. Further, the method of manufacture enables the incorporation of additional structures between the inner and outer structures that are then joined together to form more complex structures.

While this invention is described primarily in the context of tubular solid oxide fuel cells, broader applicability is envisioned. The invention is relevant to any situation where tubular objects are produced by a high temperature (greater than 900° C.) method in which a tube shrinks radially during manufacture, and the resulting object has properties that vary in the radial direction. Such properties include but are not limited to: pore size, total porosity, chemical composition, electronic insulation or conductivity, thermal insulation or conductivity, wear resistance, etc.

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein.

All referenced documents cited herein are incorporated by reference for all purposes.

What is claimed:

1. A method of joining concentric tubular structures to form a composite tubular structure comprising:
   forming a free-standing inner tubular structure and a free-standing porous outer tubular structure, the outer tubular structure having a higher radial shrinkage upon free sintering than the inner tubular structure, wherein one of the tubular structures comprises ceramic and the other tubular structure comprises metal;
   concentrically disposing the outer tubular structure over the inner tubular structure;
   sintering the concentrically disposed tubular structures such that the outer tubular structure radially shrinks and mechanically joins to the inner structure to form the composite tubular structure;
   wherein the composite structure is a solid oxide fuel cell structure, the outer tubular structure comprises metal, and the inner tubular structure comprises,
   an inner tubular current collector layer comprised of a porous metal,
   an inner electrode layer adjacent the inner current collector layer, the inner electrode layer comprised of porous ceramic electrolyte,
   an electrolyte layer adjacent the inner electrode layer, the electrolyte layer comprised of a dense ceramic, and
   an outer electrode layer adjacent the electrolyte layer, the outer electrode layer comprised of porous ceramic electrolyte.

2. The method of claim 1, wherein, prior to the sintering, the inner tubular structure comprises a sintered tubular member and the outer tubular structure comprises a green or bisque-fired tubular member.

3. The method of claim 1, wherein, prior to the sintering, the inner tubular structure comprises a green or bisque-fired tubular member and the outer tubular structure comprises a green or bisque-fired tubular member that displays a higher radial shrinkage upon free sintering than the inner tubular member.

4. The method of claim 1, wherein the disposing comprises slipping the outer tubular structure around the inner tubular structure.

5. The method of claim 1, wherein the outer tubular structure is porous metal.

6. The method of claim 5, wherein the porous metal is selected from the group consisting of FeCr, NiCr, Ni, Ag, Cu, and alloys and mixtures thereof.

7. The method of claim 1, further comprising one or more mechanical interlocking features on an outer surface of the inner tubular structure.

8. The method of claim 7, wherein the outer tubular structure is deformed to engage the one or more mechanical interlocking features.

9. The method of claim 1, further comprising an intermediate member disposed between and mechanically joined to the inner and outer tubular structures.

10. The method of claim 9, wherein the intermediate member facilitates joining the tubular structure to other objects.

11. The method of claim 1, further comprising concentrically disposing a third member about the outer tubular structure and applying a radial compressive force on the outer tubular structure via a radial compressive force induced by shrinkage of the third tubular member during sintering that is greater than that of the outer tubular structure.

12. The method of claim 1, wherein the outer tubular structure comprises two or more concentric layers.

13. The method of claim 1 wherein a porous layer of conductive material is disposed between the inner and outer tubular structures prior to sintering.

14. The method of claim 13, wherein the particle size of the conductive material before sintering is less than 25 micrometers.

15. A composite tubular structure made according to the method of claim 1.

16. A method of joining concentric tubular structures to form a composite tubular structure comprising:
   forming a free-standing inner tubular structure and a free-standing porous outer tubular structures structure, the outer tubular structure having a higher radial shrinkage upon free sintering than the inner tubular structure, wherein one of the tubular structures comprises ceramic and the other tubular structure comprises metal;
   concentrically disposing the outer tubular structure over the inner tubular structure;
   sintering the concentrically disposed tubular structures such that the outer tubular structure radially shrinks and mechanically joins to the inner structure to form the composite tubular structure;
   wherein, prior to the sintering, the inner tubular structure comprises a green or bisque-fired tubular member and the outer tubular structure comprises a green or bisque-fired tubular member that displays a higher radial shrinkage upon free sintering than the inner tubular member; and
   wherein said joining method joins metal and ceramic.

17. The method of claim 16, wherein the inner tubular structure is a single tubular member.

18. The method of claim 16, wherein the inner tubular structure comprises a plurality of concentric layers comprising materials selected from the group consisting of metals, ceramics and cermets, and the outer tubular structure comprises metal.

19. The method of claim 16, wherein the inner tubular member comprises ceramic and the outer tubular member is metal.

20. The method of claim 19, wherein the inner tubular structure comprises YSZ and the outer tubular structure is stainless steel.

* * * * *